June 30, 1931.   L. C. MAMBOURG   1,812,599
APPARATUS FOR PRODUCING SHEET GLASS
Filed Sept. 6, 1927

Inventor
Luke C. Mambourg
By Frank Fraser
Attorney

Patented June 30, 1931

1,812,599

UNITED STATES PATENT OFFICE

LUKE C. MAMBOURG, OF LANCASTER, OHIO, ASSIGNOR TO LIBBEY-OWENS-FORD GLASS COMPANY, OF TOLEDO, OHIO, A CORPORATION OF OHIO

APPARATUS FOR PRODUCING SHEET GLASS

Application filed September 6, 1927. Serial No. 217,585.

The present invention relates to a process and apparatus for producing sheet glass.

An important object of the invention is to provide a process and apparatus for producing sheet glass wherein a mass of molten glass is contained in a suitable receptacle over which are arranged sheet forming means and means associated with the edges of the pot and cooperating with the sheet forming means to assist in producing a sheet of desired width.

Another object of the invention is to provide means of this nature wherein a suitable block is arranged under the forming rolls and positioned along the sides of said pot, the blocks being free to float but preferably retained in proper position with respect to the base of the sheet by lip tiles which are also provided to protect the sheet and forming parts therefor.

A still further object of the invention is to provide a sheet glass forming apparatus of this nature wherein a pair of preferably positively driven rolls are arranged above a mass of molten glass, the glass being contained in a suitable receptacle whereby upon rotation of the rolls, the molten glass will be moved upwardly between the rolls and there reduced to a sheet of predetermined thickness, which sheet is preferably deflected over one of the forming rolls, the ends of said rolls being reduced in a manner to create thickened edges on the sheet, while floating blocks are arranged under the rolls and in the molten glass to restrict the effective width of the pot at the base of the sheet so that the glass forming the sheet will not exceed the desired limits.

Other objects and advantages of the invention will become more apparent during the course of the following description when taken in connection with the accompanying drawings.

Figure 1:
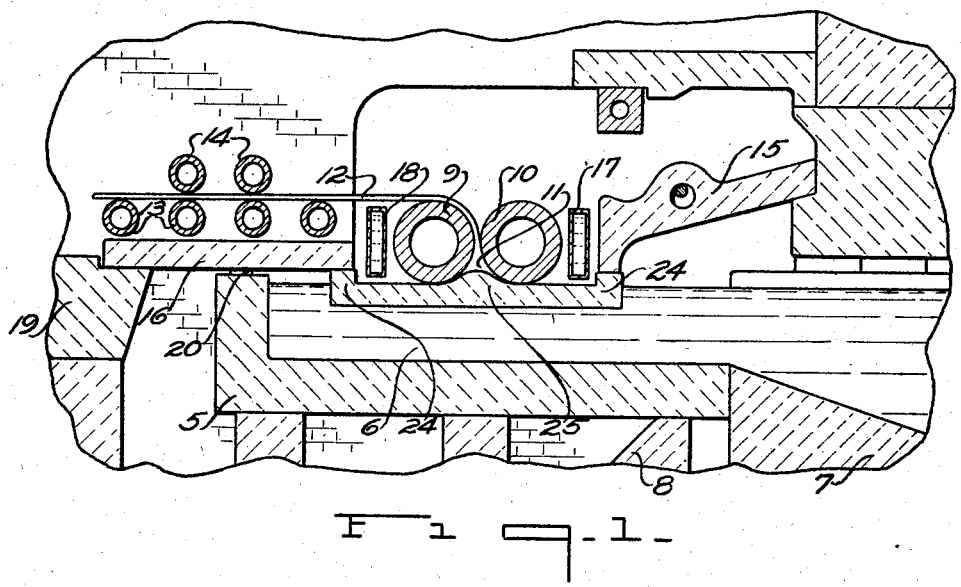
Figure 2:
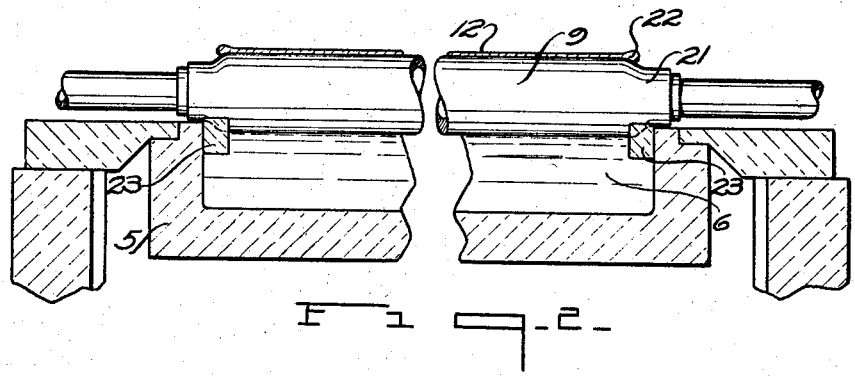

In the drawings wherein like numerals are employed to designate like parts throughout the same, Fig. 1 is a vertical longitudinal section through a rolling machine formed in accordance with the present invention, and Fig. 2 is a vertical transverse section thereof.

This invention relates particularly to the type of machine disclosed in the application of Drake and Mambourg, Serial No. 214,278, filed August 20, 1927.

In the drawings, the numeral 5 designates a working receptacle adapted to contain a mass of molten glass 6 which may be continuously supplied from any desired type of melting furnace 7. The receptacle 5 is preferably supported, by means of stools 8, in a suitably heated compartment.

Arranged above the mass of glass 6 is a pair of preferably positively driven rolls 9 and 10 respectively, the rolls being preferably arranged so that a straight line through their axes of rotation will be horizontally disposed, the rolls thus assuming a position as illustrated in Fig. 1. The rolls are so disposed that they create a sheet forming pass, whereby upon rotation of the rolls and proper handling of the glass, a mass 11 is advanced upwardly and through the pass where it is reduced or rolled into a sheet 12 having a predetermined thickness. The sheet, in addition to being a predetermined thickness, is flat and smooth, thus making it particularly useful in the manufacture of plate glass. Although the sheet formed with this machine is well adapted for the manufacture of plate glass, wherein the sheet, after it has been formed and annealed, is subsequently surfaced such as by grinding and polishing, it is to be understood that the glass does not necessarily have to be so surfaced.

It is preferred that the sheet 12 be deflected into a horizontal plane over one of the rolls, and as shown is deflected into a horizontal plane over the roll 9, while the sheet 12 in the horizontal is supported by and conveyed on the rolls 13. The rolls 13 may be driven at a slightly greater peripheral speed than the rolls 9 and 10 so that the sheet will be placed under a slight tension. The upper rolls 14 may also be used and are adapted to contact with the sheet in a manner to prevent buckling or warping thereof, but it is preferred that the weight of the rolls and the speed thereof are such that there is no appreciable reduction in thickness of the sheet 12 after it leaves the sheet forming pass created between the pair of sheet forming rolls.

Arranged above the molten glass are the tiles 15 and 16 respectively, and the heat absorbing shields 17 and 18, associated with said tiles. The tile 16 is represented diagrammatically, and it is preferred that it be constructed along the lines of the tile illustrated in the above mentioned copending application. The tile 16 is supported at one end on the block 19 and centrally thereof on the supports 20 resting upon the end of the working receptacle 5.

As shown in Fig. 2, the ends of the rolls 9 and 10 are reduced as at 21 in a manner that the thickened or beaded edges 22 will be formed on the sheet 12. Due to the fact that the surface of the molten glass 6 is below the top of the sides and end of the receptacle 5, it is desired that the reduced end 21 be of such a nature to allow the main body part of the rolls to rest upon the surface of the glass 6. It is desirable that the rolls rest upon the surface of the molten glass 6 in order to build up the proper mass 11 from which the sheet is rolled. In the use of the machine, however, it has been found that the position of the rolls can be varied and still create a sufficiently heavy mass of glass 11 from which the sheet 12 may be rolled, but I prefer that the lower peripheries of the sheet forming rolls 9 and 10 just rest upon the surface of the mass 6. A desired position of the rolls is clearly illustrated in Fig. 2 showing the lower periphery of the roll 9 in contact with the surface of the molten glass.

To prevent an excessive amount of glass being advanced upwardly to the sheet forming pass and to assist in creating the proper edge on the sheet produced, I provide a block 23 at each edge of the sheet source as shown in Fig. 2. The blocks 23 may be formed from clay or any desired metal such as nichrome or the like. Its construction is preferably such that it will float upon the glass and be retained in position by means of the projections 24 contacting with the tiles 15 and 16, this construction being illustrated in Fig. 1. Each block also preferably has an upstanding portion 25 of a shape and size to permit it to extend upwardly between the rolls as shown in Fig. 1. Each block 23 is adapted to be arranged along its respective side or edge of the receptacle 5, and as stated is adapted to float up and down if desired, although its buoyancy is preferably such that it will normally be held in a fixed position by reason of contact with the tiles 15 and 16.

By arranging the edge or floating blocks as shown, the molten glass is not fed to the edges in excessive amounts, and therefore it is possible to control accurately the width of sheet produced and at the same time a regular smooth edge will be formed on the sheet instead of an uneven ragged edge. If excessive amounts of glass are permitted to be moved upwardly difficulty sometimes arises because this glass is relatively colder than the rest of the glass due to the fact that it is in contact with the pot walls. It is a known fact that the glass along the sides of a stream are relatively colder than the balance of the stream, and if large quantities of this cold glass is allowed to move upwardly it may be difficult to cause an actual rolling of the sheet and to hold it at the desired thickness. In the present instance, however, the glass is supplied to the edges from a supply remote from the walls of the receptacle 5, and this glass may be fed diagonally outward so that the same width of sheet may be produced but without the difficulties above referred to.

The shape of the blocks may vary, and for instance the portion extending upwardly between the rolls may be pointed instead of rounded. Further, the blocks may be hollow to permit the passage of a temperature control medium therethrough.

It is to be understod that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a receptacle containing a mass of molten glass, a pair of rotatable rolls mounted thereover and arranged to create a sheet forming pass, and a pair of non-metallic refractory members arranged within the molten glass contained in said receptacle, one of said members being positioned under the rolls at one side of the receptacle and the other of said members being placed in a similar position at the opposite side of the receptacle, said refractory members being provided for controlling the movement of glass toward the ends of the sheet forming pass between the rolls.

2. In sheet glass apparatus, a receptacle containing a mass of molten glass, a pair of rotatable rolls mounted thereover and arranged to create a sheet forming pass, and a pair of non-metallic refractory members arranged within the molten glass contained in said receptacle, one of said members being positioned at each side of the receptacle and under the rolls, said members being provided with portions extending upwardly into the space disposed beneath the rolls and adapted to control the movement of glass upwardly from the mass to the sheet forming pass between said rolls.

3. In sheet glass apparatus, a receptacle containing a mass of molten glass, a pair of rotatable rolls mounted thereover and arranged to create a sheet forming pass, and a pair of non-metallic refractory members arranged within the molten glass contained in said receptacle, one of said members being positioned under the rolls at one side of the receptacle and the other of said members being placed in a similar position at the opposite side of the receptacle, said refractory members being provided for controlling the movement of glass toward the ends of the sheet forming pass between the rolls, each member having portions contacting with the rolls.

4. In sheet glass apparatus, a receptacle containing a mass of molten glass, a pair of rotatable rolls mounted thereover and arranged to create a sheet forming pass, and a pair of non-metallic refractory members arranged within the molten glass contained in said receptacle, one of said members being positioned at each side of the receptacle and under the rolls, said members being provided with portions extending upwardly into the space disposed beneath the rolls and adapted to control the movement of glass upwardly from the mass to the ends of the sheet forming pass between said rolls, each member having portions contacting with the rolls.

5. In sheet glass apparatus, a receptacle containing a mass of molten glass, a pair of rotatable rolls mounted thereover and arranged to create a sheet forming pass, and non-metallic refractory blocks arranged at the sides of the receptacle in the molten glass and beneath the rolls to control the movement of glass toward the ends of the sheet forming pass created between the rolls.

6. In sheet glass apparatus, a receptacle containing a mass of molten glass, a pair of rotatable rolls mounted thereover and arranged to create a sheet forming pass, and non-metallic refractory blocks arranged at the sides of the receptacle in the molten glass and beneath the rolls to control the movement of glass toward the ends of the sheet forming pass created between the rolls, said blocks having portions extending upwardly into the space beneath the rolls when they are in operative position.

7. In sheet glass apparatus, a receptacle containing a mass of molten glass, a pair of rotatable rolls mounted thereover and arranged to create a sheet forming pass, a pair of floating members arranged within the molten glass contained in said receptacle, one of said members being positioned under the rolls at one side of the receptacle and the other of said members being placed in a similar position at the opposite side of the receptacle.

8. In sheet glass apparatus, a receptacle containing a mass of molten glass, a pair of rotatable rolls mounted thereover and arranged to create a sheet forming pass, and a pair of floating members arranged within the molten glass contained in said receptacle, one of said members being positioned under the rolls at one side of the receptacle and the other of said members being placed in a similar position at the opposite side of the receptacle, each of said floating members having a portion extending upwardly into the space formed under the rolls when they are in operative association.

9. In sheet glass apparatus, a receptacle containing a mass of molten glass, a pair of rotatable rolls mounted thereover and arranged to create a sheet forming pass, and a pair of floating members arranged within the molten glass contained in said receptacle, one of said members being positioned under the rolls at one side of the receptacle and the other of said members being placed in a similar position at the opposite side of the receptacle, the buoyancy of said members being such that they will normally contact with the lower portions of the rolls when they are in operative association.

10. In sheet glass apparatus, a receptacle containing a mass of molten glass, a pair of rotatable rolls mounted thereover and arranged to create a sheet forming pass, and a floating block arranged in the molten glass and under the said pair of rolls at each edge of the receptacle, said blocks being normally held in contact with the lower portions of the rolls by reason of the buoyancy thereof.

11. In sheet glass apparatus, a receptacle containing a mass of molten glass, a pair of rotatable rolls mounted thereover and arranged to create a sheet forming pass, and a floating member arranged under said pair of rolls and at each edge of the base of the sheet, said members being free to float up and down in the molten glass and normally contacting with the lower portions of the rolls when they are in operative association for controlling the movement of the glass to the ends of the sheet forming pass between the rolls.

12. In sheet glass apparatus, a receptacle containing a mass of molten glass, a pair of rotatable rolls mounted thereover and arranged to create a sheet forming pass, and a floating member arranged under said pair of rolls and at each edge of the base of the sheet, said members being free to float up and down in the molten glass and normally contacting with the lower portions of the rolls when they are in operative association, each of said members having a portion extending upwardly into the space lying beneath the sheet forming pass between the rolls for controlling the movement of the glass to the ends of the sheet forming pass between the rolls.

13. In sheet glass apparatus, a receptacle containing a mass of molten glass, a pair of rotatable rolls mounted thereover and arranged to create a sheet forming pass, and a pair of floating non-metallic refractory members arranged within the molten glass contained in said receptacle, one of said members being positioned under the rolls at one side of the receptacle and the other of said members being placed in a similar position at the opposite side of the receptacle, said members being provided for controlling the movement of the glass to the ends of the sheet forming pass between the rolls.

14. In sheet glass apparatus, a receptacle containing a mass of molten glass, a pair of rotatable rolls mounted thereover and arranged to create a sheet forming pass, a pair of floating members arranged within the molten glass contained in said receptacle, one of said members being positioned under the rolls at one side of the receptacle and the other of said members being placed in a similar position at the opposite side of the receptacle, and means for limiting the upward movement of said members.

15. In sheet glass apparatus, a receptacle containing a mass of molten glass, a pair of rotatable rolls mounted thereover and arranged to create a sheet forming pass, and a pair of floating non-metallic refractory members arranged within the molten glass contained in said receptacle, one of said members being positioned under the rolls at one side of the receptacle and the other of said members being placed in a similar position at the opposite side of the receptacle, said members contacting with the lower portions of the rolls and adapted to control the movement of the glass to the ends of the sheet forming pass between the rolls.

16. In sheet glass apparatus, a receptacle containing a mass of molten glass, a pair of rotatable rolls mounted thereover and arranged to create a sheet forming pass, and a non-metallic refractory member disposed beneath the rolls under the ends of the sheet forming pass thereof for controlling the movement of the glass towards the ends of the sheet forming pass between the rolls.

17. In sheet glass apparatus, a receptacle containing a mass of molten glass, a pair of rotatable rolls mounted thereover and arranged to create a sheet forming pass, and a non-metallic refractory member disposed beneath the rolls under the ends of the sheet forming parts thereof for controlling the movement of the glass toward the ends of the sheet forming pass between the rolls, said members being in contact with the lower portions of said rolls.

18. In sheet glass apparatus, a receptacle containing a mass of molten glass, a pair of rotatable rolls mounted thereover and arranged to create a sheet forming pass, and a non-metallic refractory member disposed beneath the rolls under the ends of the sheet forming parts thereof for controlling the movement of the glass toward the ends of the sheet forming pass between the rolls, said members having portions extending upwardly into the space lying beneath the rolls when they are in operative association and for controlling the movement of glass toward the ends of the sheet forming pass created between the rolls.

19. In sheet glass working apparatus, the combination of a furnace containing a mass of molten glass, a pair of sheet forming rolls spaced to form a sheet forming pass and to reduce the molten glass received within said pass, members free to float toward and away from said sheet forming pass disposed adjacent opposite ends of the rolls and between the rolls and the source of molten glass for controlling the movement of the glass toward the ends of the sheet forming pass between the rolls.

20. In sheet glass working apparatus, the combination of a furnace containing a mass of molten glass, a pair of sheet forming rolls spaced to form a sheet forming pass and to reduce the molten glass received within said pass, non-metallic refractory members free to float toward and away from said sheet forming pass disposed adjacent opposite ends of the rolls and between the rolls and the source of molten glass for controlling the movement of the glass toward the ends of the sheet forming pass between the rolls.

Signed at Lancaster, in the county of Fairfield and State of Ohio, this 1st day of September, 1927.

LUKE C. MAMBOURG.